United States Patent Office 3,284,226
Patented Nov. 8, 1966

3,284,226
METHOD OF TREATING OPAL GLASS SURFACES
James R. A. Taylor, Plainfield, Ill., assignor, by mesne assignments, to Brockway Glass Company, Inc., Brockway, Pa., a corporation of New York
No Drawing. Filed Oct. 11, 1963, Ser. No. 315,685
20 Claims. (Cl. 117—54)

This invention relates to a method of decorating opal glass surfaces with gold and other noble metals, and more particularly to a method of pretreating opal glass surfaces in order to improve their capability to accept and retain highly adherent specular noble metal film decoration.

Opal glass has gained widespread use in the manufacture of lighting globes, ointment jars, tableware, ovenware, table tops, wall paneling, and the like. This type of glass is translucent and appears to be white, due to the fact that it contains embedded within its structure many tiny inclusions which have different indices of refraction from that of the glass itself, thus causing light falling upon it to be scattered. The opal glass of greatest commercial importance consists of a matrix of relatively high refractive index soda-lime-silica glass containing as inclusions low refractive index crystals of calcium fluoride and sodium fluoride. These inclusions are usually produced by introducing fluorspar or cryolite into the glass batch.

Decoration of glass with gold and other noble metal films, in the form of lettering or various designs, is conventionally accomplished by applying metallo-organic compound solutions—known as "liquid bright metals"—to the glass surface by means of the screen printing technique, and then firing in a decorating lehr to volatilize and burn off the nonmetallic components of the liquid bright metal, leaving a very thin film of the metal itself. However, attempts to decorate opal glass in this manner have been altogether successful. The excess alkali and alkaline earth metal oxides and fluorides present on the surface of opal glass impair the adhesion of the noble metal film decoration and also detract from its brightness. Barely acceptable adhesion of the metallic decoration has been obtained only by the use of firing temperatures approximating the deformation point of the glass, which in may cases, results in lehr belt marking of the bearing surface of the glass item being decorated.

Various pretreatments of the opal glass surface have been proposed in order to overcome the deleterious effects of the excess alkali and alkaline earth metal oxides and fluorides present thereon. Since these undesirable compounds are not readily soluble in water, a hot water soak or rinse is not effective. Strong mineral acids and sulfur trioxide have been suggested as pretreating agents, but the highly corrosive nature of these materials and the safety hazards they impose make their use almost impractical. It has also been proposed to deposit additional compounds on the glass surface which would increase the adhesion of the metallic decoration and/or improve its appearance, but the use of this method on a high speed, high volume production line for low profit items would be uneconomical.

It is an object of this invention to provide noble metal decorated opal glass surfaces wherein the metallic film decoration exhibits improved adhesion to the glass surface.

A further object of this invention is to provide noble metal decorated opal glass surfaces wherein the metallic film decoration exhibits improved brightness of appearance.

Another object of this invention is to provide a method for decorating opal glass surfaces with highly adherent specular noble metal film wherein firing temperatures substantially below the deformation point of the glass may be employed.

An additional object of this invention is to provide an economical method for pretreating opal glass surfaces in order to improve their capability of accepting and retaining highly adherent specular noble metal film decoration.

Still another object of this invention is to provide a method for effecting removal of excess alkali and alkaline earth metal oxides and fluorides from the surface of opal glass, employing treating agents which are relatively non-corrosive and safe to handle.

The aforegoing objects are achieved by the method of the present invention which includes the step of pretreating the opal glass surface, prior to the application thereto of the noble metal decoration, with a dilute aqueous solution of one or more of the organic acidic compounds hereinafter specified. By means of this pretreatment, excess alkali and alkaline earth metal oxides and fluorides present on the opal glass surface, in particular, sodium oxide, calcium oxide, sodium fluoride and calcium fluoride, are converted into water-soluble alkali and alkaline earth metals salts which become dissolved in the aqueous pretreatment solution. The pretreated glass surface is thereafter preferably rinsed with water to remove any excess pretreatment solution therefrom and then allowed to dry.

The opal glass surface pretreated in the above-described manner is thereby rendered free of interfering alkali and alkaline earth metal oxides and fluorides, and can then have liquid bright metal applied thereto and be fired in a decorating lehr at temperatures substantially below the deformation point of the glass. The resulting noble metal film decoration, due to the pretreatment step, exhibits improved adhesion to the glass surface and improved brightness of appearance.

The pretreatment of the present invention is effective for opal glass items formed by pressing or blowing. The improved results obtained are especially pronounced in the case of pressed opal ware where the surface, due to the method of forming used, is more highly contaminated with the alkali and alkaline earth metal oxides and fluorides than is the surface of blown opal ware.

The organic acidic compound employed in the pretreatment solution in accordance with the present invention may be any one or more of citric acid, lactic acid, glycolic acid, ascorbic acid, uric acid, fumaric acid or ethylenediaminetetraacetic acid. These compounds are all comparatively weak acids and have the common properties of reacting with alkali and alkaline earth metal oxides and fluorides to form water-soluble alkali and alkaline earth metal salts, and also of being relatively non-corrosive and safe to handle. The preferred organic acidic compounds are lactic acid and uric acid, the former being more commercially practical.

The concentration of the organic acidic compound in the aqueous pretreatment solution is not critical and may be varied within reasonable limits so long as sufficient acid is present to react with substantially all of the excess alkali and alkaline earth metal oxides and fluorides present on the opal glass surface. Acid concentrations within the range of from about 0.1 percent to about 0.5 percent by weight are preferred, with the most satisfactory performance being obtained when the solution pH ranges from about 4.5 to about 2.3. A solution pH of about 4.0 has been found to give the optimum results.

The temperature at which the pretreatment is effected is also not critical and may be varied from room temperature to the boiling point of the pretreatment solution, with longer pretreatment times necessitated by lower temperatures. It is preferred to maintain the pretreatment solution at a temperature within the range of from about 130° F. to about 212° F., with a corresponding pretreatment time of from about 4 minutes to about 30 seconds.

The pretreatment may be effected by means of convention immersion, contact or spray techniques. For example, the opal glass structure may be simply submerged in the pretreatment solution, or it may be passed into contact with an applicator member containing the pretreatment solution or through a spray, mist or bath of the pretreatment solution.

The following example is given to illustrate the pretreatment method of the present invention.

EXAMPLE 1

A blown opal glass sample was immersed for thirty seconds in a boiling aqueous solution containing 0.5 percent by weight of lactic acid. The glass was then withdrawn from the solution, rinsed with cold tap water to remove excess pretreatment solution from its surface, and allowed to air dry. The used pretreatment solution, upon analysis, was found to contain calcium, sodium and fluoride ions which were not present in the solution initially, indicating removal of these ions from the opal glass surface.

Similar results were obtained when citric acid, glycolic acid, ascorbic acid, uric acid, fumaric acid and ethylenediaminetetraacetic acid were each substituted for the lactic acid in the pretreatment solution of Example 1.

Following the pretreatment step, noble metal decoration can be applied to the opal glass surface by means of conventional decorating techniques. The liquid bright metals used for this purpose, such as liquid bright gold, liquid bright silver, liquid bright platinum and liquid bright palladium, are commercially available preparations, the principal ingredients of which are organic compounds of the noble metal dissolved in organic solvents, the noble metal content ranging from about 4 to 25 percent by weight. These preparations also contain small amounts of organic compounds of other metals such as rhodium, bismuth, chromium and tin, which act as fluxes during the firing operation and bond the noble metal film to the glass substrate. The liquid bright metal is screen printed onto the pretreated opal glass surface and then fired in a decorating lehr at a maximum temperature sufficient to volatilize and burn off the nonmetallic components of the liquid bright metal and leave deposited on the opal glass surface a highly adherent, continuous specular thin film of the noble metal. The decorating lehrs used in commercial operation are continuous mesh-belt furnaces about 100 feet long and divided along their length into three separate zones—a preheat zone 15 to 20 feet long where the ware is heated gradually from room temperature to the firing temperature, the fire box proper which is about 20 to 25 feet long, and a controlled cooling zone where the ware is very slowly cooled from the firing temperature to room temperature. The entire firing cycle, including preheating, firing and cooling, is completed in about 1½ hours.

The following example is given to illustrate the substantially reduced firing temperature permitted by means of the pretreatment step of the present invention.

EXAMPLE 2

Liquid bright gold was screen printed onto the surface of the pretreated blown opal glass sample of Example 1. The sample was then sent through a decorating lehr. It was found that a maximum firing temperature in the lehr of 1070° F. was required to obtain a specular 22-karat gold film firmly attached to the opal glass surface. The bearing surface of the glass sample was smooth and gave no signs of deformation.

As a comparison, a control sample of the same blown opal glass having no pretreatment was screen printed with liquid bright gold and passed through a decorating lehr. A maximum firing temperature in the lehr of 1150° was employed. Even at this higher firing temperature, adhesion of the gold film decoration was barely acceptable. Furthermore, the bearing surface of the control sample exhibited lehr belt marking, indicating that the deformation point of the glass had been reached in the lehr.

One advantage of employing the pretreatment step of the present invention is readily apparent from the foregoing example. By means of the present invention, noble metal decorated opal glass ware having good adhesion between the noble metal film and the opal glass surface, can be produced at substantially reduced firing temperatures, thus eliminating the danger of glass deformation in the decorating lehr.

Adhesion of the noble metal film decoration of the opal glass surface is measured by a laboratory testing procedure which has been found to accelerate the chemical action simulating aging and handling in normal use. This procedure makes use of a synthetic sweat solution, which is made up as a concentrate for storage purposes and then diluted with 9 parts of distilled water to 1 part of concentrate as needed for the test. The synthetic sweat concentrate has the following formulation:

| | Grams |
|---|---|
| Distilled water | 991.6 |
| Propionic acid | 0.62 |
| Acetic acid | 0.96 |
| Caprylic acid | 0.46 |
| Sodium chloride | 70.00 |
| 85% USP lactic acid | 10.00 |
| Citric acid | 1.00 |
| Ascorbic acid | 0.40 |
| Urea | 0.27 |
| Uric acid | 0.27 |

The test procedure comprises immersing a decorated opal glass test sample for 10 minutes in the synthetic sweat solution maintained at 160° F.±10° F., and then removing the test sample from the solution and allowing it to cool to room temperature. When cool the test sample is rubbed vigorously under running cold tap water in an attempt to remove the noble metal film decoration. The test sample is rated on a numerical scale based on the size of the largest single area from which decoration has been removed. The ratings and their explanation are given in the following table, in which the area of decoration removed refers to the size of the largest single area from which decoration has been removed.

Table 1
ADHESION RATINGS

| Rating | Area of Decoration Removed |
|---|---|
| 0 | Greater than 1″ by 1″. |
| 1 | Greater than ½″ by ½″ and less than 1″ by 1″. |
| 2 | Greater than ¼″ by ¼″ and less than ½″ by ½″. |
| 3 | Less than ¼″ by ¼″. |
| 4 | No removal (perfect adhesion). |

The appearance of the noble metal film decoration is rated visually according to the scale set forth in the following table.

Table 2
APPEARANCE RATINGS

| Rating | Appearance |
|---|---|
| 0 | Ware physically distorted beyond point of being a usable container by heat or chemical action. |
| 1 | Metal film discolored (black, purple, red, etc.). |
| 2 | Metal film fogged and having water spotty appearance. |
| 3 | Metal film fogged all over evenly. |
| 4 | Metal film lightly fogged but still reflective. |
| 5 | Metal film bright and reflective with no visible defects. |

In Table 3, adhesion and appearance ratings are set out for several samples of gold decorated opal glass ware in order to show a comparison in this respect between decorated opal ware which had no pretreatment and the same decorated opal ware which had been pretreated according to the present invention prior to decoration. Ratings are given for both pressed opal glass ware and blown opal glass ware. In the case of those samples which had been pretreated, the pretreatment was carried out in the manner described in Example 1, with the organic acidic compound being varied as indicated. All samples were decorated and fired in the manner described in Example 2, with the maximum firing temperature (M.F.T.) being varied as indicated. Each of the adhesion and appearance ratings given represents an average of three samples.

Table 3

| Pretreatment | M.F.T., °F. | Adhesion Rating | | Appearance Rating | |
|---|---|---|---|---|---|
| | | Pressed | Blown | Pressed | Blown |
| None | 1,150 | 0 | 1.3 | 3.7 | 2.7 |
| None | 1,070 | 0 | 1.0 | 2.7 | 2.7 |
| Lactic acid | 1,070 | 4.0 | 4.0 | 4.7 | 5.0 |
| Citric acid | 1,070 | 4.0 | 4.0 | 4.7 | 5.0 |
| Glycolic acid | 1,070 | 4.0 | 4.0 | 5.0 | 5.0 |
| Ascorbic acid | 1,070 | 4.0 | 4.0 | 5.0 | 5.0 |
| Uric acid | 1,070 | 4.0 | 4.0 | 5.0 | 5.0 |
| Fumaric acid | 1,070 | 4.0 | 4.0 | 5.0 | 5.0 |
| Ethylenediaminetetraacetic acid | 1,070 | 3.7 | 4.0 | 5.0 | 5.0 |

The above table clearly demonstrates the highly significant improvement obtained in the adhesion and appearance of noble metal film decoration on both pressed and blown opal glass ware by means of the pretreatment step of the present invention. The pretreatment not only permits the use of much lower firing temperatures in the decorating lehr, but also results at the lower firing temperature, in noble metal film decoration having adhesion and appearance substantially better than that obtained even at the higher firing temperature approximating the deformation point of the glass.

The pretreatment of the present invention, while providing the improved results described above, occasionally results in a slight discoloration of the opal ware after the firing operation. This discoloration is in the form of dark spots which are embedded in the glass itself and cannot be washed off. It is believed that these spots are small deposits of elemental carbon resulting from the decomposition, at the firing temperature, of intermediate organic salts which are formed by an incomplete reaction between the organic acidic compound in the pretreatment solution and a small portion of the metal fluorides on the opal glass surface, these salts being water-insoluble and remaining on the glass surface after the pretreatment. Although for the most part this spotting effect is negligible and presents no serious problem, there may be instances wherein a completely homogeneous solid white opal surface is required and even the slightest discoloration would be objectionable. It has been found that the incorporation into the pretreatment solution of a small amount of ammonium hydroxide, e.g., about 0.5 mole of ammonium hydroxide per mole of organic acidic compound, eliminates the discoloring side effect of the pretreatment without detracting from the effectiveness thereof. The presence of the ammonium ion in the pretreatment solution apparently prevents the formation of intermediate water-insoluble inorganic salts and thus ensures complete removal of contaminating materials from the opal glass surface.

A preferred embodiment of the present invention, employing approximately 0.5 mole of ammonium hydroxide per mole of organic acidic compound in the pretreatment solution, is illustrated by the following example.

EXAMPLE 3

A blown opal glass sample was immersed for thirty seconds in a boiling aqueous solution containing 0.5 percent by weight of lactic acid and 0.1 percent by weight of ammonium hydroxide. The glass was then withdrawn from the solution, rinsed with cold tap water to remove excess pretreatment solution from its surface, and allowed to air dry. Liquid bright gold was screen printed onto the pretreated opal glass surface, and the sample was then fired in a decorating lehr at a maximum temperature of 1070° F. The resulting 22-karat gold film decoration was found to have an adhesion rating of 4 and an appearance rating of 5. Furthermore, the non-decorated portion of the pretreated opal glass surface had a completely homogeneous solid white appearance with no evidence of any discoloration.

It will be understood that it is intended to cover all changes and modifications of the examples of the invention herein chosen for the purpose of illustration which do not constitute departures from the spirit and scope of the invention.

I claim:

1. In the method of decorating opal glass surfaces with fired-on noble metal film, the opal glass consisting of matrix of relatively high refractive index soda-lime-silica glass containing as inclusions low refractive index crystals of calcium fluoride and sodium fluoride and the noble metal deposited from the heat decomposition of a noble metallo organic compound, the improvement comprising pretreating the opal glass surface, prior to the application thereto of the noble metal decoration, with a dilute aqueous solution of an organic acidic compound selected from the group consisting of citric acid, lactic acid, glycolic acid, ascorbic acid, uric acid, fumaric acid, ethylenediaminetetraacetic acid and mixtures thereof to effect removal from said opal glass surface of excess oxides and fluorides of alkali and alkaline earth metals.

2. The method of claim 1 including the additional step of rinsing the pretreated opal glass surface with water to remove therefrom excess pretreatment solution.

3. The method of claim 1 wherein the pretreatment is carried out for a period ranging from about 4 minutes to about 30 seconds, and the pretreatment solution is maintained at a temperature within the range of from about 130° F. to about 212° F.

4. The method of claim 1 wherein the concentration of the organic acidic compound in the pretreatment solution is within the range of from about 0.1 percent to about 0.5 percent by weight.

5. The method of claim 1 wherein the pretreatment solution additionally contains about 0.5 mole of ammonium hydroxide per mole of organic acidic compound.

6. The method of claim 1 wherein the pH of the pretreatment solution is within the range of from about 4.5 to about 2.3.

7. The method of claim 6 wherein the pH of the pretreatment solution is about 4.0.

8. The method of claim 6 wherein the organic acidic compound is lactic acid.

9. The method of claim 6 wherein the organic acidic compound is uric acid.

10. The method of treating opal glass surfaces of opal glass consisting of a matrix of relatively high refractive index soda-lime-silica glass containing as inclusions low refractive index crystals of calcium fluoride and sodium fluoride, to effect removal therefrom of excess oxides and fluorides of alkali and alkaline earth metals and thereby to render said opal glass surface capable of being decorated at substantially reduced firing temperatures with fired-on noble metal film, deposited from the heat decomposition of a noble metal organic compound, having improved adhesion to said opal glass surface and improved brightness of appearance, comprising contacting the opal glass surface, for a period ranging from about 4 minutes to about 30 seconds, with an aqueous solution containing from about 0.1 percent to about 0.5 percent by weight of an organic acidic compound selected from the group consisting of citric acid, lactic acid, glycolic acid, ascorbic acid, uric acid, fumaric acid, ethylenediaminetetraacetic acid and mixtures thereof, said solution being maintained at a temperature within the range of from about 130° F. to about 212° F.

11. The method of claim 10 including the additional step of rinsing the treated opal glass surface with water to remove therefrom excess treating solution.

12. The method of claim 10 wherein the treating solution additionally contains about 0.5 mole of ammonium hydroxide per mole of organic acidic compound.

13. The method of claim 10 wherein the pH of the treating solution is within the range of from about 4.5 to about 2.3.

14. The method of claim 13 wherein the organic acidic compound is lactic acid.

15. The method of claim 13 wherein the organic acidic compound is uric acid.

16. The method of providing opal glass surfaces of opal glass consisting of a matrix of relatively high refractive index soda-lime-silica glass containing as inclusions low refractive index crystals of calcium fluoride and sodium fluoride, with gold film decoration exhibiting improved adhesion to said opal glass surface and improved brightness of appearance, comprising the steps of:

(1) pretreating the opal glass surface with a dilute aqueous solution of an organic acidic compound selected from the group consisting of citric acid, lactic acid, glycolic acid, ascorbic acid, uric acid, fumaric acid, ethylenediaminetetraacetic acid and mixtures thereof to effect removal from said opal glass surface of excess oxides and fluorides of alkali and alkaline earth metals;

(2) rinsing the pretreated opal glass surface with water to remove therefrom excess pretreatment solution;

(3) drying the pretreated opal glass surface;

(4) applying a solution of gold organic compound to the pretreated opal glass surface; and (5) firing in a decorating lehr at a maximum temperature which is substantially below the deformation point of the glass and which is sufficiently high to convert the gold organic compound to a highly adherent, continuous, specular, 22-karat gold film.

17. The method of claim 16 wherein the pH of the pretreatment solution is within the range of from about 4.5 to about 2.3.

18. The method of claim 17 wherein the pretreatment solution additionally contains about 0.5 mole of ammonium hydroxide per mole of organic acidic compound.

19. The method of claim 18 wherein the organic acidic compound is lactic acid.

20. The method of claim 18 wherein the organic acidic compound is uric acid.

References Cited by the Examiner
UNITED STATES PATENTS

| | | | |
|---|---|---|---|
| 267,713 | 11/1882 | Peirce | 117—35 |
| 2,303,756 | 12/1942 | Nordberg et al. | 117—54 |
| 2,968,578 | 1/1961 | Mochel | 117—124 |
| 3,054,221 | 9/1962 | Elmer | 65—31 |
| 3,087,831 | 4/1963 | Browne | 117—35 |

MURRAY KATZ, *Primary Examiner.*